United States Patent
Braun et al.

(10) Patent No.: US 6,934,431 B2
(45) Date of Patent: Aug. 23, 2005

(54) VARIABLE OPTICAL DELAY LINES AND METHODS FOR MAKING SAME

(75) Inventors: Linda M. Braun, Chatham, NJ (US); William Robert Holland, Warrington, PA (US); Jane D. LeGrange, Princeton, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/773,844

(22) Filed: Feb. 1, 2001

(65) Prior Publication Data

US 2002/0067877 A1 Jun. 6, 2002

Related U.S. Application Data

(60) Provisional application No. 60/251,748, filed on Dec. 6, 2000.

(51) Int. Cl.[7] .................................................. G02B 6/26
(52) U.S. Cl. ............................ 385/15; 385/16; 385/17; 385/18; 385/19; 385/24; 385/40; 385/139; 385/140; 359/130; 359/127

(58) Field of Search ............................. 385/15, 16, 17, 385/18, 24, 40, 139, 140; 359/130, 127, 139, 140

(56) References Cited

U.S. PATENT DOCUMENTS

| | | | | |
|---|---|---|---|---|
| 4,671,605 A | * | 6/1987 | Soref | ............................ 385/2 |
| 5,018,816 A | * | 5/1991 | Murray et al. | ............. 350/96.2 |
| 5,729,642 A | * | 3/1998 | Thaniyavarn | ................ 385/17 |
| 5,793,508 A | * | 8/1998 | Meli | ............................ 359/130 |
| 6,356,377 B1 | * | 3/2002 | Bishop et al. | ............... 359/290 |

\* cited by examiner

*Primary Examiner*—Tarifur R. Chowdhury
*Assistant Examiner*—George Y. Wang

(57) ABSTRACT

In accordance with the invention, a high-resolution variable optical delay line comprises an optical switch, such as an optical micromechanical mirror switch, and an array of delay fiber paths. Each delay fiber path in the array comprises a region where the fiber is curved differently from the other fibers in the region and a reflector. Each fiber path advantageously comprises other regions where the fiber is essentially parallel to the other fibers in the region. Each fiber is curved differently from the others in order that the fiber paths each provide a different delay.

8 Claims, 2 Drawing Sheets

VARIABLE OPTICAL DELAY LINES AND METHODS FOR MAKING SAME

CROSS REFERENCES TO RELATED APPLICATIONS

This application claims the benefit of U.S. Provisional Application Ser. No. 60/251,748 of identical title filed by the present inventors on Dec. 6, 2000, which is incorporated herein by reference.

FIELD OF THE INVENTION

This invention relates to variable optical delay lines and, in particular, to a high resolution variable delay line where the time delay can be programmably selected from a plurality of closely spaced time periods.

BACKGROUND OF THE INVENTION

One of the major advances in communications in recent years has been the increased use of optical fiber systems for carrying large quantities of information with low distortion and low cost over great distances.

Optical delay lines are important components in optical communications for switching streams of optical signals from one path to another. For example, optical delay lines are critical components in packet switching used in Internet applications. Delay lines are also the building blocks in the correlation filters used to recognize packet addresses. They are also used in the buffers which control the timing of signal routing. Delay lines are used for synchronizing data bits, for compensating differential dispersion between different optical paths, and for compensating differential delay between paths. Because of the dynamics of high-speed systems, different delays may be required at different times.

A variable optical delay line typically comprises a plurality of optical fibers, each cut to a slightly different length, and a fiber switch to switch an input signal among them and thus control the delay. In principle this should work, but in practice it has serious shortcomings for high-speed systems. Cutting fibers to a precision of millimeters is difficult, and this difficulty limits the achievable accuracy of delay time. Moreover, a variable delay line having a large dynamic range will require many precisely cut fibers. It is not practical to provide sufficient precisely cut fibers to provide fine delay increments (high temporal resolution) over a large dynamic range. Accordingly there is a need for an improved variable optical delay line capable of providing high resolution over a large dynamic range.

SUMMARY OF THE INVENTION

In accordance with the invention, a high-resolution variable optical delay line comprises an optical switch, such as an optical micromechanical mirror switch, and an array of delay fibers paths. Each delay fiber path in the array comprises a first region where the fiber is curved differently from the other fibers in the region, advantageously at least a second other region where the fiber is essentially parallel to the other fibers in the region, and a reflector. Each fiber is curved differently from the others in order that the fiber paths each provide a different delay. The reflector is advantageously disposed in a parallel region.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
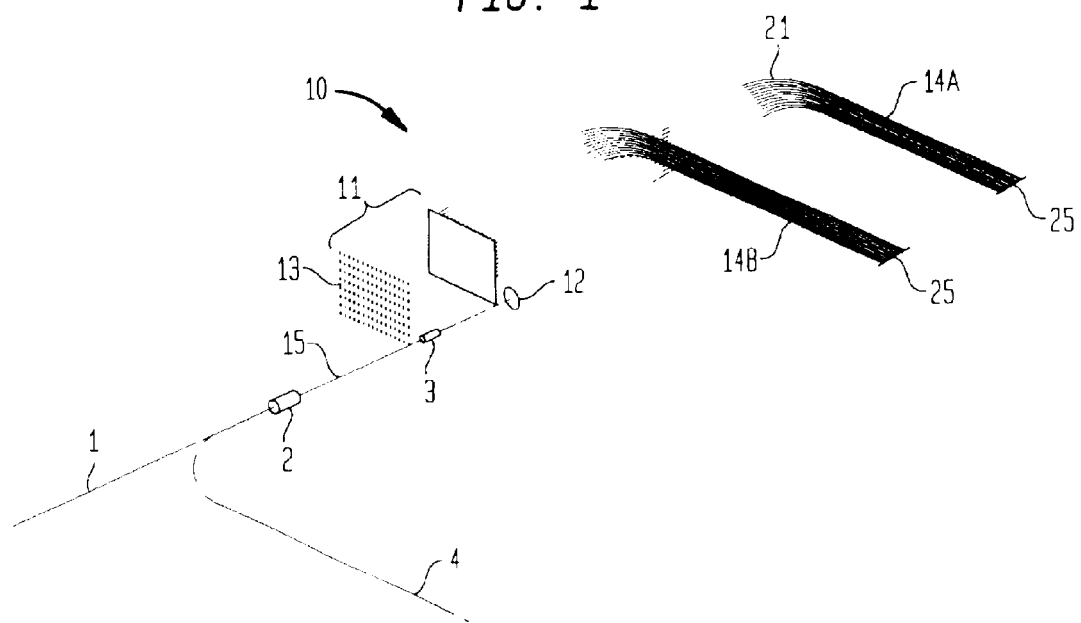
FIG. 1 is a schematic illustration of a variable optical delay line in accordance with the invention.

Referring to the drawings, FIG. 1 is a schematic illustration of a variable optical delay line 10 in accordance with the invention. The delay line 10 comprises an optical switch 11 such as a micromechanical mirror switch (MEMs switch) composed of a controllable scanning mirror 12 and a mirror array 13. The delay line further includes one or more fiber arrays 14A and 14B of fiber delay paths. As will be shown below, each fiber array comprises a plurality of fiber paths. Each fiber path comprises a curved region 21 where the fiber is curved differently from the other fibers in the array, a second region 22 where the fiber is parallel to other fibers in the array, and a reflector 25. The array is designed so that each fiber path will reflect an input signal with a different delay than the other paths in the array. An array of collimator lenses (now shown) couples light in and out of the fiber array.

Suitable MEMs mirror switches and their fabrication are described, for example, in U.S. Pat. No. 5,629,7990 issued to Nukermans et al. On May 13, 1997 which is incorporated herein by reference. Suitable switches are also described in U.S. application Ser. No. 09/415,178 filed by V. Aksyuk on Nov. 8, 1999 and Ser. No. 09/559,216 filed by Greywall on Apr. 26, 2000, both of which are incorporated herein by reference. Alternatively, waveguide switches can be used.

Figure 2:
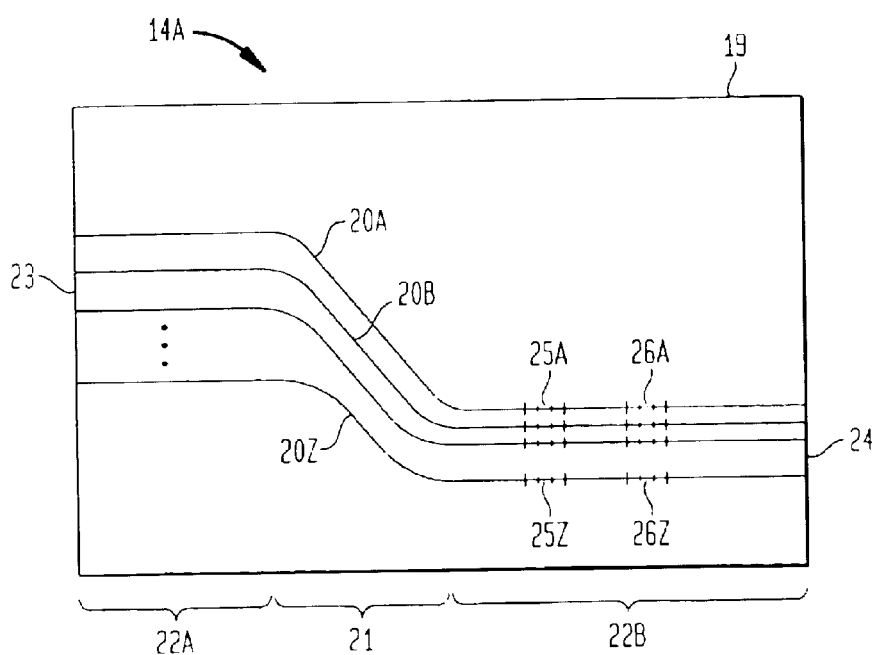
FIG. 2 is a schematic top view of a simplified array of fiber paths useful in the delay line of FIG. 1.

FIG. 2 is a top view of an exemplary fiber array, e.g. array 14A, composed of a plurality of optical fiber paths 20A, 20B, . . . , 20Z. Each fiber path can comprise three fiber regions 22A, 21 and 22B. Each fiber 20 begins in a first linear array 23 and ends in a second linear array 24. Between the beginning and the end, the fibers have different curvatures so that their respective optical path lengths are different.

In regions 22A and 22B, the fibers are substantially parallel, as in a multifiber ribbon. In region 22B each fiber includes one or more reflective elements such as Bragg gratings. For example, fiber path 20A has gratings 25A and 26A. Similarly, fiber path 20Z has gratings 25Z and 26Z. The Bragg gratings are preferably switchable between reflection and transmission.

This fiber array presents important advantages in manufacture. The array can be readily fabricated as a computer generated optical fiber circuit using techniques well known in the art. In essence, a computer guides the point-by-point placement of fibers 20A, 20B, . . . , 20Z on an adhesive-coated substrate 19. This process is described in detail in U.S. Pat. No. 5,259,051 issued to J. Burack et al. On Nov. 2, 1993 and U.S. Pat. No. 5,421,970 issued to W. Holland on Jun. 6, 1995, which are incorporated herein by reference.

The reflectors 25 can be Bragg gratings conventionally formed in the fibers by conventional methods such as by sidewriting with ultraviolet light. An important advantage of the parallel orientation of the fibers in region 22B is that the gratings can be aligned along the same transverse section of a fiber ribbon. This has the important effect that all gratings across a ribbon, e.g. 25A, 25B, 25Z, can all be formed in a single UV exposure.

The reflector gratings 25 can be made switchable by any one of a wide variety of techniques. The gratings can be switched by magnetically, thermally, piezoelectrically or by magnetostriction. The preferred method is by use of magnetic strain tuning using latchable magnets.

Exemplary switchable gratings are described, for example, in U.S. Pat. No. 6,154,590 issued to S. Jin et al. On Nov. 28, 2000; U.S. Pat. No. 6,128,427 issued to Espindola et al. On Oct. 3, 2000; U.S. Pat. No. 5,987,200 issued to Fleming et al. On Nov. 16, 1999; and U.S. Pat. No. 6,122, 421 issued to Adams et al. On Sep. 19, 2000. All of these patents are incorporated herein by reference. Alternatively, the reflectors 25 can be mechanically movable mirrors.

Referring to FIG. 1, the operation of the inventive variable delay line may now be explained. An input optical signal can be applied via an input fiber 1. It passes through an optical circulator 2 and strikes scanning mirror 12. Mirror 12 is controlled to direct the signal to the mirror of array 13 which will reflect the input signal into the fiber path of a fiber array that provides the desired delay. The signal propagates into the fiber path and is reflected by the first operational reflector in the path. Upon reflection, the signal reemerges from the fiber path, reflects from the mirrors 13 and 12, passes through the collimator 3, and is redirected by circulator 2 to an output fiber 4. Between the circulator 2 and the reflectors 25, the input and output signals share a common path 15.

Advantageously each fiber path includes a plurality of separately switchable reflectors, e.g. 25A, 26A of path 20A. Successive reflectors can be used to achieve coarse delay increments. Selection of particular fibers can provide fine delay increments.

The advantages of this device are manifold. The delay line is fast and provides arbitrarily small delay time increments. It is easily scalable to longer delay times, has low insertion loss, has coarse and fine control, and is suitable for batch manufacture.

Figure 3:
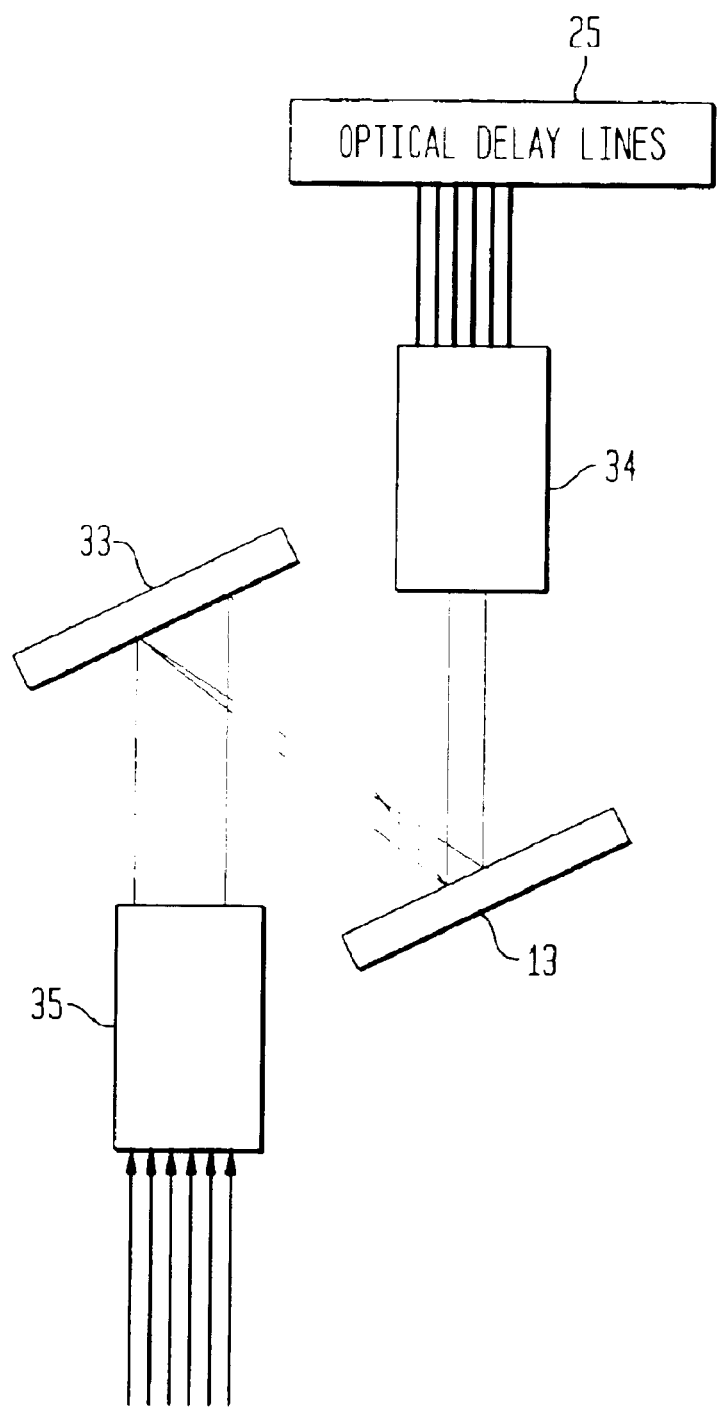
FIG. 3 illustrates a second embodiment of a variable optical delay line.

FIG. 3 illustrates an alternative embodiment of a variable optical delay line similar to that of FIG. 1 except that scanning mirror 12 has been replaced by a second mirror array 33 and the single input/output path 15 of FIG. 1 has been replaced by a plurality of input/output paths 35. With this embodiment, each of the input beams can be switched among a plurality of delay fibers in an array 34, each fiber providing a different delay. The collimators and circulators have been omitted for clarity of illustration.

The embodiment of FIG. 3 is particularly useful as a multiwavelength optical communication system wherein different wavelength channels may require different delays, as might be required to perform switching. The different wavelength channels can be provided on different input fibers and switched to different delay fibers providing the delay needed for each respective wavelength channel. Moreover, if the switch configuration changes, the mirrors of the arrays can be reoriented to redirect the input wavelength channels and thereby adjust the delay spectrum they experience.

It is to be understood that the above-described embodiments are illustrative of only a few of the many possible specific embodiments, which can represent applications of the principles of the invention. Numerous and varied other arrangements can be readily devised by those skilled in the art without departing from the spirit and scope of the invention.

What is claimed is:

1. A variable optical delay line comprising:
a plurality of fibers disposed in a closely spaced array, the array comprising a first parallel region, a curved region, and a second parallel region; each fiber having a first end disposed in a first linear array and a second end disposed in a second linear array, the curved regions of the fibers differing in radii of curvature to provide a successive series of monotonically different path lengths, the path lengths differing by a few millimeters or less to provide small delay time increments;
separately switchable reflectors disposed in each of the fibers, the reflectors switchable between reflection and transmission to provide coarse delay increments.

2. The delay line of claim 1 further including a MEMs mirror optical switch optically coupled to the plurality of fibers for switching at least one optical input signal among the fibers of the plurality.

3. The delay line of claim 1 wherein includes a the separately switchable reflectors comprise reflective Bragg gratings.

4. The delay line of claim 3 wherein the reflective Bragg gratings are formed in the second parallel regions.

5. The delay line of claim 1 wherein the plurality of fibers are secured to a substrate of sheet material.

6. The delay line of 1 claim 2 wherein the at least one optical input signal is a single optical input signal and the optical switch comprises a 1×N MEMs mirror optical switch.

7. The delay line of claim 2 wherein the at least one optical input signal comprises a plurality of optical input signals and the optical switch comprises on N×N MEMs mirror optical switch.

8. The delay line of claim 2 wherein the at least one optical input signal comprises a plurality of optical input signals having respectively different wavelengths.

* * * * *